United States Patent [19]

Lisle

[11] Patent Number: 5,179,656
[45] Date of Patent: Jan. 12, 1993

[54] THREE DIMENSIONAL DIRECTIONAL POINTER ICON

[75] Inventor: Ronald J. Lisle, Austin, Tex.

[73] Assignee: International Business Machines Corporation, Armonk, N.Y.

[21] Appl. No.: 300,153

[22] Filed: Jan. 19, 1989

Related U.S. Application Data

[63] Continuation of Ser. No. 21,043, Mar. 2, 1987, abandoned.

[51] Int. Cl.[5] ............................................. G06F 15/62
[52] U.S. Cl. .................................. 395/159; 395/105; 395/119; 395/136; 364/920.08; 364/920.7; 364/927.61; 364/927.2; 364/DIG. 2
[58] Field of Search ............... 395/105, 119, 136, 159; 340/709, 710

[56] References Cited

U.S. PATENT DOCUMENTS

| | | | |
|---|---|---|---|
| 4,259,725 | 3/1981 | Andrews et al. | 364/521 |
| 4,555,775 | 11/1985 | Pike | 364/900 |
| 4,630,234 | 12/1986 | Holly | 364/900 |
| 4,656,603 | 4/1987 | Dunn | 364/900 |
| 4,688,181 | 8/1987 | Cottrell et al. | 364/521 |
| 4,697,178 | 9/1987 | Heckel | 340/729 |

FOREIGN PATENT DOCUMENTS 0183246 4/1986 European Pat. Off. .

*Primary Examiner*—David L. Clark
*Assistant Examiner*—Maria N. Von Buhr
*Attorney, Agent, or Firm*—Douglas H. Lefeve

[57] ABSTRACT

A perspective view of a pointer icon is displayed such that toward the middle of the display frame the icon appears to point toward the display surface, rather than toward an edge of the display frame. This creates an illusion that the icon, such as an arrowhead, is reversing its direction smoothly in three dimensional space. Although the display screen is only a two dimensional surface, the multiple icons can readily be configured to be shown in perspective and, therefore, appear to be three dimensional, without the requirement for gray scale or half tone display technology. The invention is readily implemented with conventional monochromatic or color graphics hardware commonly available for personal computers.

9 Claims, 8 Drawing Sheets

APA Display - 640 x 200 Pels

THREE DIMENSIONAL DIRECTIONAL POINTER ICON

This is a continuation of application Ser. No. 07/021,043 filed Mar. 2, 1987, now abandoned.

DESCRIPTION

1. Technical Field

This invention relates to data processing systems in general and more particularly to a data processing system which includes a directional pointer which is configured to give the appearance of being a three dimensional object on a two dimensional display.

2. Background Art

In computer systems employing a visual display device and a keyboard there is usually a moveable marker on the screen of the visual display device known as a cursor, which denotes the location which the next action taken by the keyboard will affect. For example, in word processing applications the cursor position on the visual display device usually denotes the location at which the next symbol generated by the keyboard will be entered into the document. However, while the cursor is currently associated with a symbol which has previously been keyed, the keyboard selection of a "delete" function will remove the character then associated with the cursor.

In virtually all prior art keyboard/display applications, whether used in a nonintelligent terminal environment or in a standalone, high performance computer application, the keyboard, has included a plurality of keys which are used to move the position of this moveable marker on the visual display, without otherwise affecting the displayed information. These keys, known as cursor motion keys, were sometimes dedicated only to this function, while in other systems they were used as cursor motion keys only while another key was depressed or toggled to shift the function of these keys from another function such as numeric keys or character keys to the cursor motion function.

Cursor motion keys have typically moved the cursor position in increments on the visual display device. These keys have typically moved the cursor one character position to the left or right for each short depression of the horizontal motion keys and one line position up or down for each short depression of the vertical cursor motion keys. In many systems a longer depression of a cursor motion key results in repetitive, but incremental movement of the cursor position on the visual display device.

Many computer programs used in conjunction with keyboards and visual display devices provide additional flexibility with the use of cursor motion keys. More specifically, these programs have provided greater direct incremental movements of the cursor position than the previous movements of single character positions or a rapid succession of single character movements. For example, word processing programs have provided the capability to advance the cursor from any position along a horizontal line of text to either the beginning of that line or to the end of that line by depression of an additional control key before the cursor motion key is depressed. Similarly, some word processing programs have provided for cursor movements by word, by paragraph, or by page in a similar manner. In each of these cases, the cursor movement was from an undefined location to a logically finite point. It has not been known to use cursor motion keys to move the cursor from such an unknown location to another random location in a direct movement For such a movement to the second, random location, it has been necessary when using cursor motion keys to increment the cursor in one coordinate direction until that coordinate of the random point has been reached and then increment the cursor in the other coordinate direction until the second coordinate of the random location of the cursor has been reached.

In addition to the cursor motion keys there exists a class of pointing devices which let one move a pointer on the visual display device in a rapid, direct manner, rather than by incremental movements. One example of this class of devices has come to be commonly referred to as a "mouse". These devices have come to be used to allow an operator to rapidly point to an operation, command, function, or option named on the display which is desired to be selected by the clicking of a button associated with the pointing device. This pointing device has also been used with the button associated therewith to rapidly move a pointer from the beginning to the end of a block of data to be marked for further processing, such as moving the data, copying the data, or deleting the data. Additionally, the pointer has been used in the prior art to rapidly change the position of a cursor by a direct movement, rather than the incremental movement of the cursor motion keys.

For the purposes of simplifying the remaining description of this invention, the mouse will be used as the example of the above described class of pointing devices, although those skilled in the art will recognize that this invention is also applicable to the display of pointers controlled by other pointing devices such as, but not limited to, joysticks, tablets, and light pens.

When a mouse and the visual pointer associated therewith are included in a data processing system, it has been a problem when a single pointer depiction, or icon, is used on the display screen to point to an item to be selected. Suppose, for example, that the orientation of this pointer is such that it points to the upper left corner of the display frame. This means, of course, that the entire pointer icon is visible when pointing to something at the top of the display frame or at the left edge of the display frame. However, with the leftward and upward orientation of the icon, it will be understood that pointing to objects at the lower or rightmost boundaries of the display screen would be impossible. The upward and leftward pointing icon is, nevertheless, perhaps the most logical orientation, since, in general, it is more often that information is placed at the top and left side of a display frame than at the bottom or right side.

One solution to the problem of not being able to display a leftward and upward pointing icon at the bottom and right side of the displayed frame has been to prohibit display of any other information in areas on the display frame which are either lower or beyond the rightmost and bottom limit at which a leftward and upward pointing icon can be displayed. This has the obvious disadvantage of removing a predetermined portion of the display frame from use, even though it may be rarely desirable to display the pointing icon in those areas.

Another solution to this problem has been to use an icon of a different, symmetrical shape, such that some portion of the icon is always in the displayable portion of the frame. For example, an icon comprising at least two crossed lines has been used instead of an arrowhead. By using the crossed lines it could always be guaranteed that at least two of the lines would be displayed even if they were moved to the lower right corner of the display frame. However, such icons comprising crossed lines have not been particularly recognizable, especially in a graphics display environment which may include a great multiplicity of other lines that could be confused with this icon. Thus, a pointer resembling some kind of arrowhead has become somewhat the standard for this type of icon.

It has also been proposed to use more than one pointer icon that changed orientation in one axis. Thus, although the pointer might always be pointing toward the left, an icon pointing upward could be used for all points in the top half of the screen and a different icon pointing downward could be used for all points in the bottom half of the screen. Utilizing this approach, it may have followed to employ icons of different orientation in the axes of the screen, such that the icons might be pointing to the upper left, to the upper right, to the lower left, and to the lower right. Utilizing such an approach, the full icon could always be visible on a display frame utilizing the entire available display area. An implementation utilizing a choice of multiple icons that can point in any direction nevertheless suffers a significant problem when the icon is pointing near the center of the display frame. When such an icon crosses either the vertical axis or the horizontal axis, there is a very distracting toggling effect that takes place, since the most minute movement of the icon on the display frame causes the pointer to somewhat reverse its orientation. This is especially apparent when the center of the screen is crossed. The provision of a much greater number of pointers minimizes the problem in one axis while maximizing the problem in the other axis. For example, consider many rightward pointing arrowheads at many different angles relative to the horizontal axis. If these are used to identify all addressable points in the right half of a display screen and a similar plurality of leftward pointing arrowheads are used to identify all addressable points on the left half of the screen, consider the toggling that occurs when the pointer is moved through the vertical axis of the screen during a horizontal movement of the pointer near the horizontal axis of the screen. At one moment all of the body of the arrowhead is on one side of the screen and immediately thereafter, all of the body of the arrowhead is on the other side of the screen.

In view of the above, in systems that use pointer icons such as arrowheads, it would be highly desirable to employ the use of multiple pointer icons without realizing the above-described abrupt, toggling effect which has been observed when the pointer is moved from one half of the screen to the other.

SUMMARY OF THE INVENTION

Accordingly, a perspective view of a pointer icon is utilized such that toward the middle of the display frame the icon appears to point toward the display surface, rather than toward an edge of the display frame. This creates an illusion that the icon, such as an arrowhead, is reversing its direction smoothly e screen is crossed. space. Although the display screen is only a two dimensional surface, the multiple icons can readily be configured to be shown in perspective and, therefore, appear to be three dimensional, without the requirement for gray scale or half tone display technology. The invention is readily implemented with conventional monochromatic or color graphics hardware commonly available for personal computers.

The foregoing and other objects, features, extensions, and advantages of the invention will be apparent from the following more particular description of preferred embodiments of the invention as illustrated in the accompanying drawings.

BEST MODE FOR CARRYING OUT THE INVENTION

Figure 1:
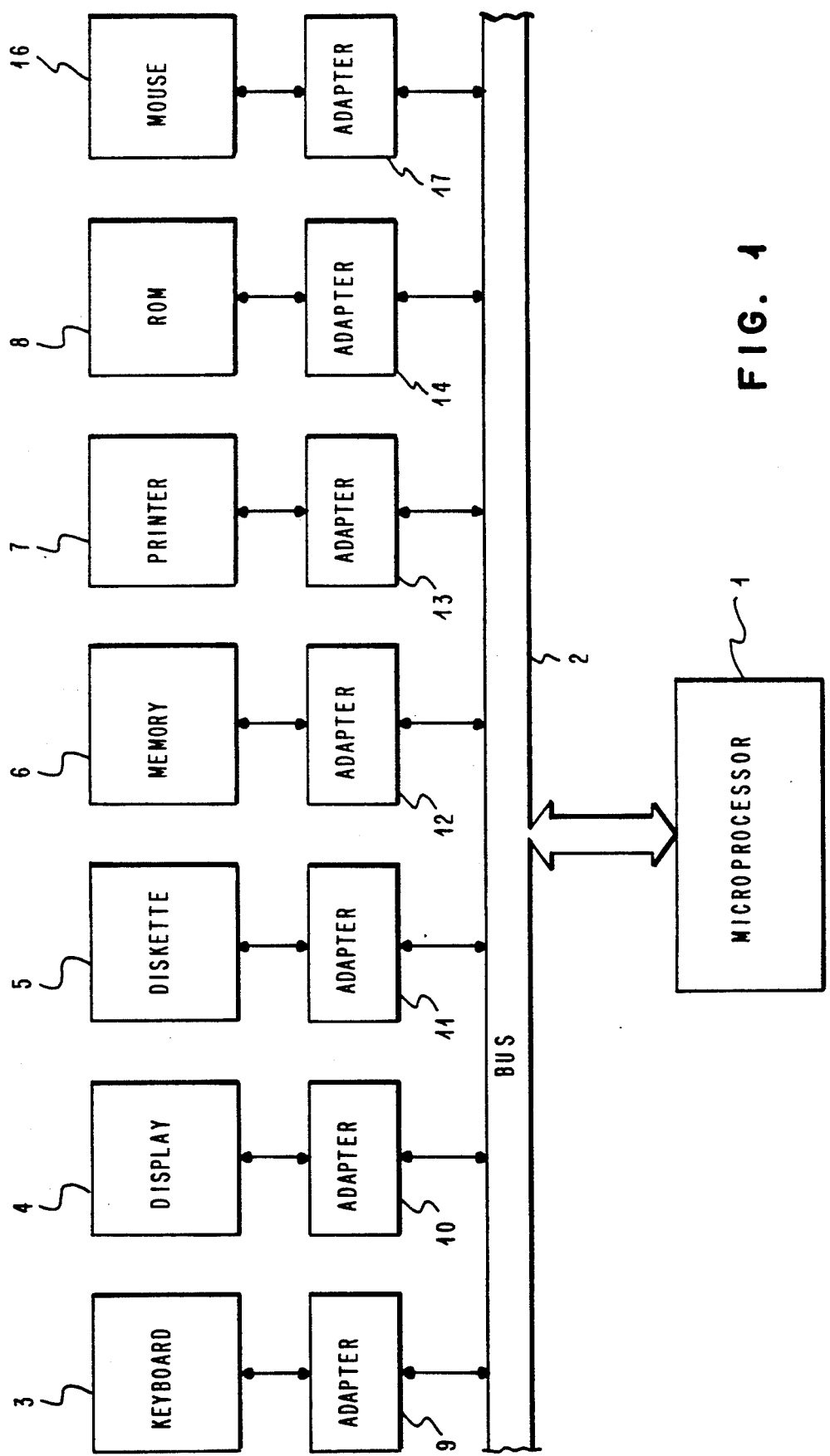
FIG. 1 is a block diagram of a data processing system which includes a stored program for performing the function of this invention in conjunction with the data processing system.

Beginning with reference to the block diagram of FIG. 1, a typical personal computer architecture is shown, such as the configuration used in the IBM Personal Computer. The focal point of this architecture comprises a microprocessor 1 which may, for example, be an Intel 8088 or similar microprocessor. The microprocessor 1 is connected to a bus 2 which comprises a set of data lines, a set of address lines and a set of control lines. A plurality of I/0 devices or memory or storage devices 3–8 and 16 are connected to the bus 2 through separate adapters 9–14 and 17, respectively. For example, the display 4 may be the IBM Personal Computer Color Display and the adapter 10 may, accordingly, be the IBM Color/Graphics Adapter. The other devices 3 and 5–8 and adapters 9 and 11–14 are either included as part of an IBM Personal Computer or are available as plug-in options from the IBM Corporation. The random access memory (RAM) 6 and the read-only memory (ROM) 8 and their corresponding adapters 12 and 14 are included as standard equipment in the IBM Personal Computer, although additional random access memory to supplement memory 6 may be added via a plug-in memory expansion option.

Within the read-only memory 8 are stored a plurality of instructions, known as the basic input/output operating system, or BIOS, for execution by the microprocessor 1. The BIOS controls the fundamental operations of the computer. An operating system such as the IBM Personal Computer Series Disk Operating System by Microsoft Corporation, or DOS, most commonly used with the IBM Personal Computer family, is loaded into the memory 6 and runs in conjunction with the BIOS stored in the ROM 8. It will be understood by those skilled in the art that the personal computer system could be configured so that parts or all of the BIOS are stored in the memory 6 rather than in the ROM 8 so as to allow modifications to the basic system operations by changes made to the BIOS program, which would then be readily loadable into the random access memory 6.

An application program such as the IBM Display-Write 4 word processing program may also be loaded into the memory 6 to provide instructions to the microprocessor 1 to enable a comprehensive set of word processing tasks, including the creation and revision of text documents, to be performed by the personal computer system shown in FIG. 1. An application program loaded into the memory 6 is said to run in conjunction with the disk operating system previously loaded into the memory 6.

When using a computer such as the IBM Personal Computer for the system shown in FIG. 1, a mouse 16 and an adapter may, for example, comprise the Microsoft Mouse. This mouse is available in either a serial version, which plugs into an Asynchronous Communications Adapter available for the IBM Personal Computer, or in a bus version which includes an adapter card which plugs into an accessory slot in the IBM Personal Computer.

Figure 2:
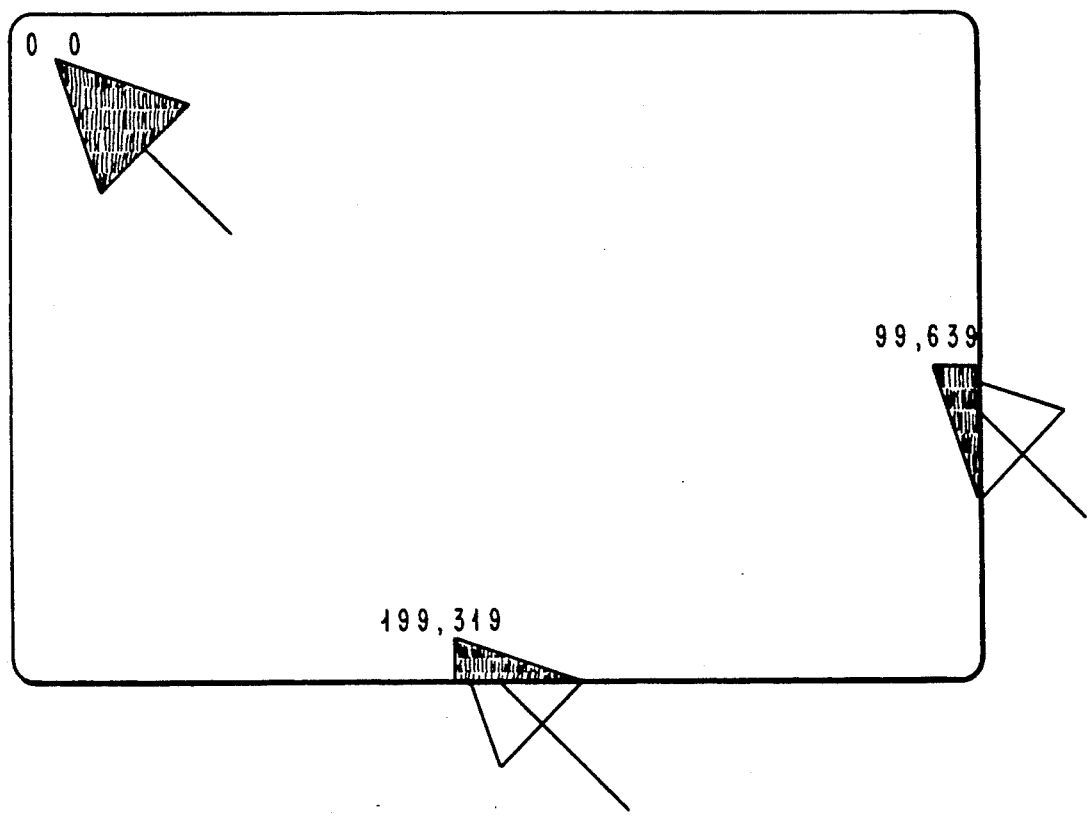
FIG. 2 is a graphical depiction of the problem encountered a single icon pointer.
Figure 3:
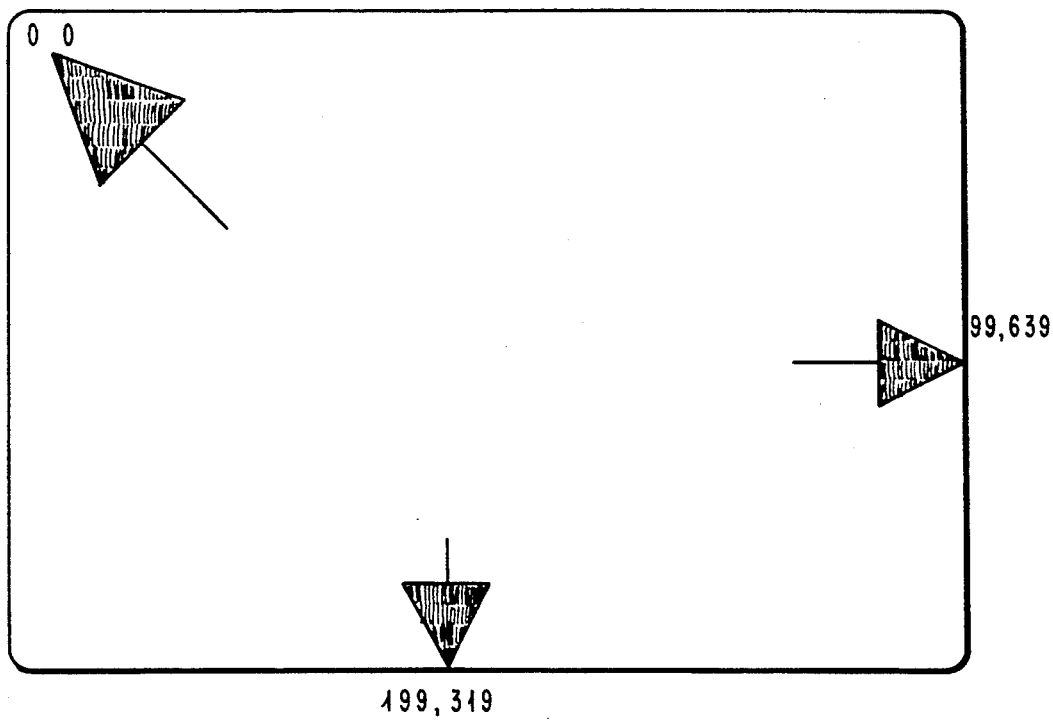
FIG. 3 is a graphical depiction of the use of a plurality of two-dimensional pointers.
Figure 3:
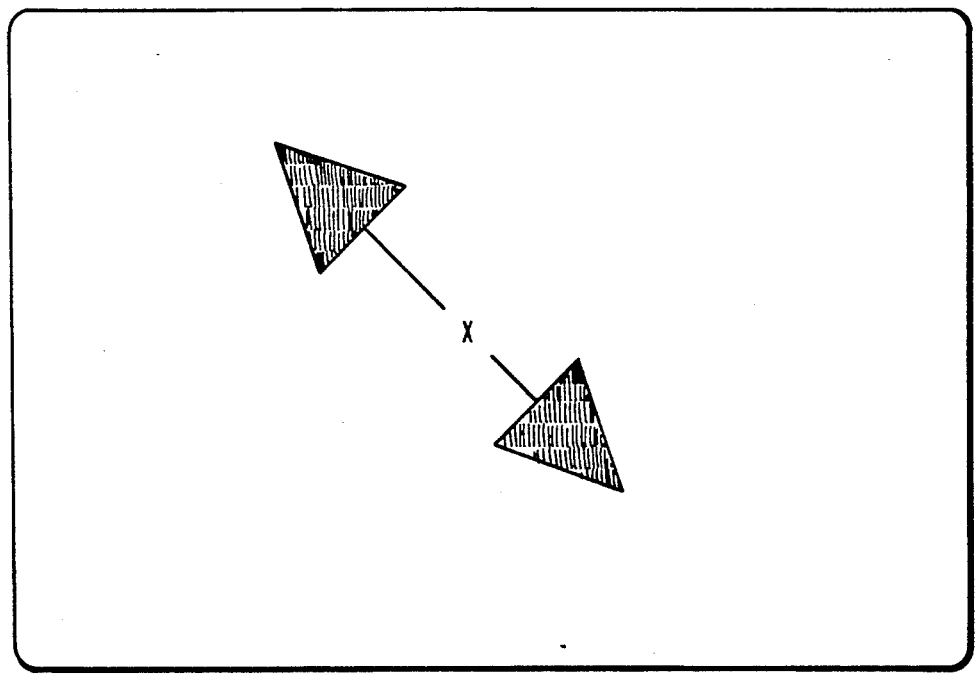

Refer now to FIGS. 2 and 3 for graphical depictions of the pointer icon problems described in the "Background" section above. Both of these figures depict all points addressable displays of 640 pels by 200 pels which are available when using the IBM Color Graphics Adapter and the IBM Color Display. In both of these figures, the numbers associated with the icon pointers are the vertical and horizontal pel coordinate positions, respectively. In FIG. 2 a single icon pointer is shown which may be fully visible in most portions of the display frame but would not be fully visible, for example, in the lower and right most portions of the display frame.

In FIG. 3 the technique of using multiple pointer icons is shown. However, consider pointer movement through the center portion of the screen in which case the icon necessarily toggles either 90 degrees or 180 degrees depending on whether one axis or both axes are crossed. Even if many more icons were provided, as long as these icons were shown to be two dimensional objects, a toggling effect would be apparent as the icon moved across the center portion of the screen.

Figure 4:
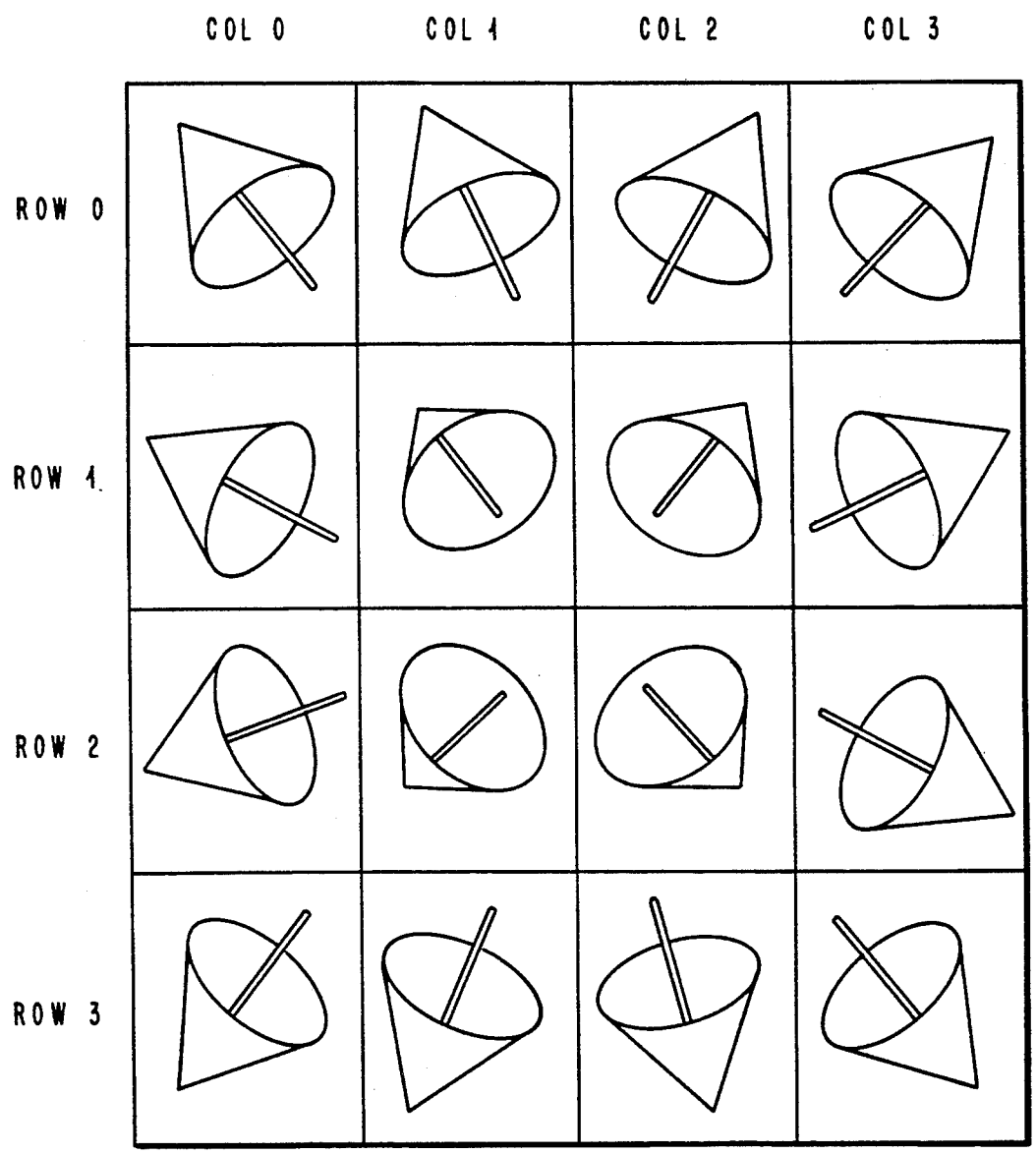
FIG. 4 is a graphical depiction of the three dimensional employed by this invention.

Refer now to FIG. 4 for a depiction of the results of an embodiment of this invention. It will be noted that FIG. 4 is shown in a grid arrangement of 16 areas. Although at the edges of FIG. 4 the direction of the icon pointer is similar to that shown in the upper portion of FIG. 3, a dramatic difference is found in the area near the center of FIG. 4. In this center area, because of the apparent three dimensional depiction of the pointer icon, the icon appears to be pointing primarily toward the flat surface of the center of the screen, rather than toward an edge of the screen. Thus, the icon pointer appears to be pointing toward the edges of the screen when the pointer is in the grid blocks which have an edge of the screen as their boundary. The more the pointer is moved toward the center of the screen, the less it appears to be primarily pointing toward an edge of the screen and the more it appears to be primarily pointing toward the flat surface of the screen. Ideally, in the very center of the screen the icon pointer would appear as a three dimensional object pointing directly toward the center of the screen and perpendicular to the surface of the screen. This is in marked contrast to the toggling of the icon pointer that occurs near the center of the screen in the prior art depiction shown in the lower portion of FIG. 3.

Accordingly, with the present invention, a plurality of icon images are utilized in which at least some of the icons depicted appear to be perspective or three dimensional representations which are tilted to point toward the flat surface of a display screen rather than lying parallel to the surface of the display screen. As the icon pointer, controlled by a pointing device such as a mouse, is moved from an edge of the screen toward the center of the screen, the icon depicting the pointer position is selected from the icons in the bit maps which depict pointers pointing toward the surface of the screen.

Figure 5A:
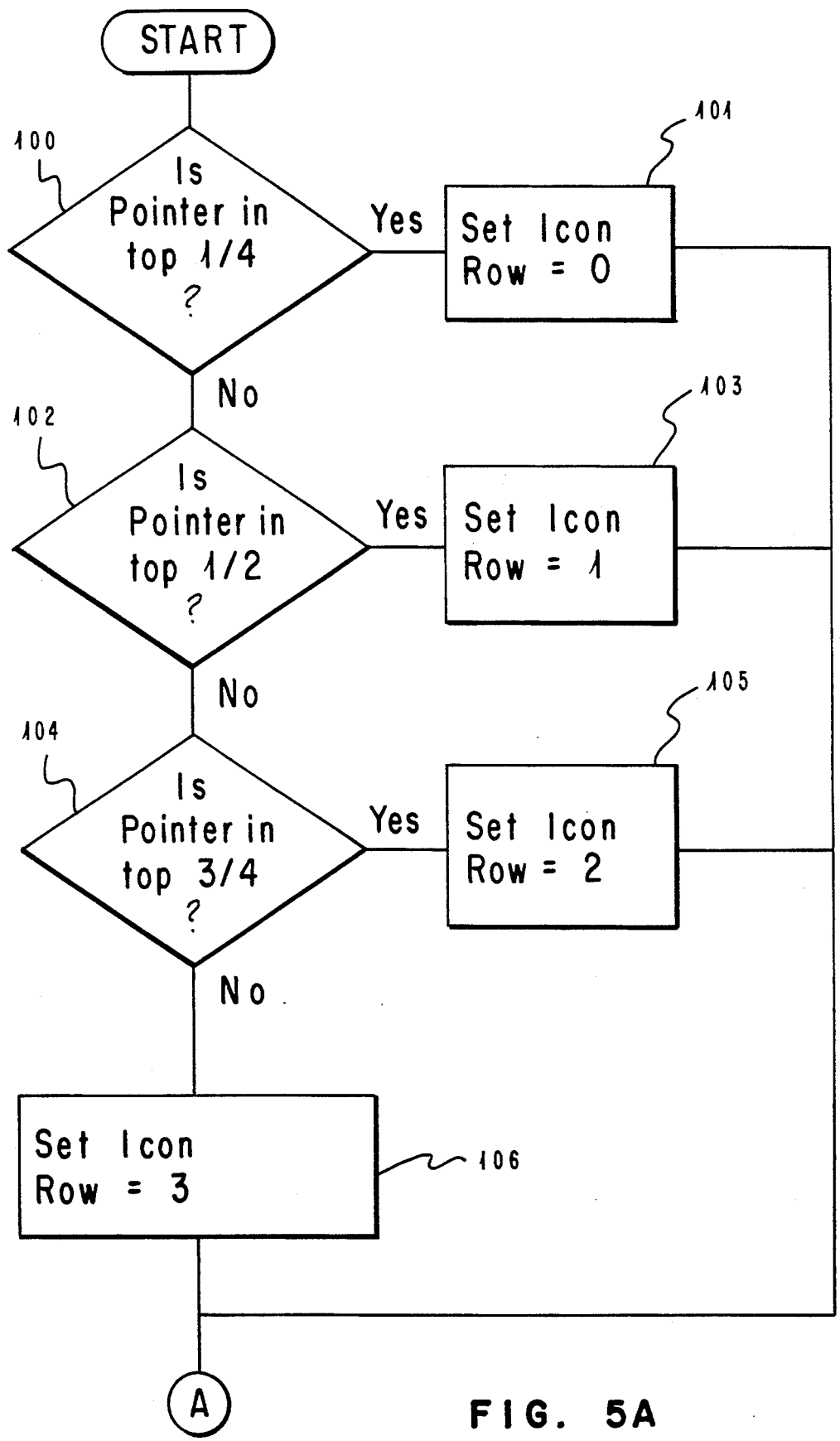
FIGS. 5A and 5B are a flow chart of the operation of displaying the three dimensional pointer icon of this invention.
Figure 5B:
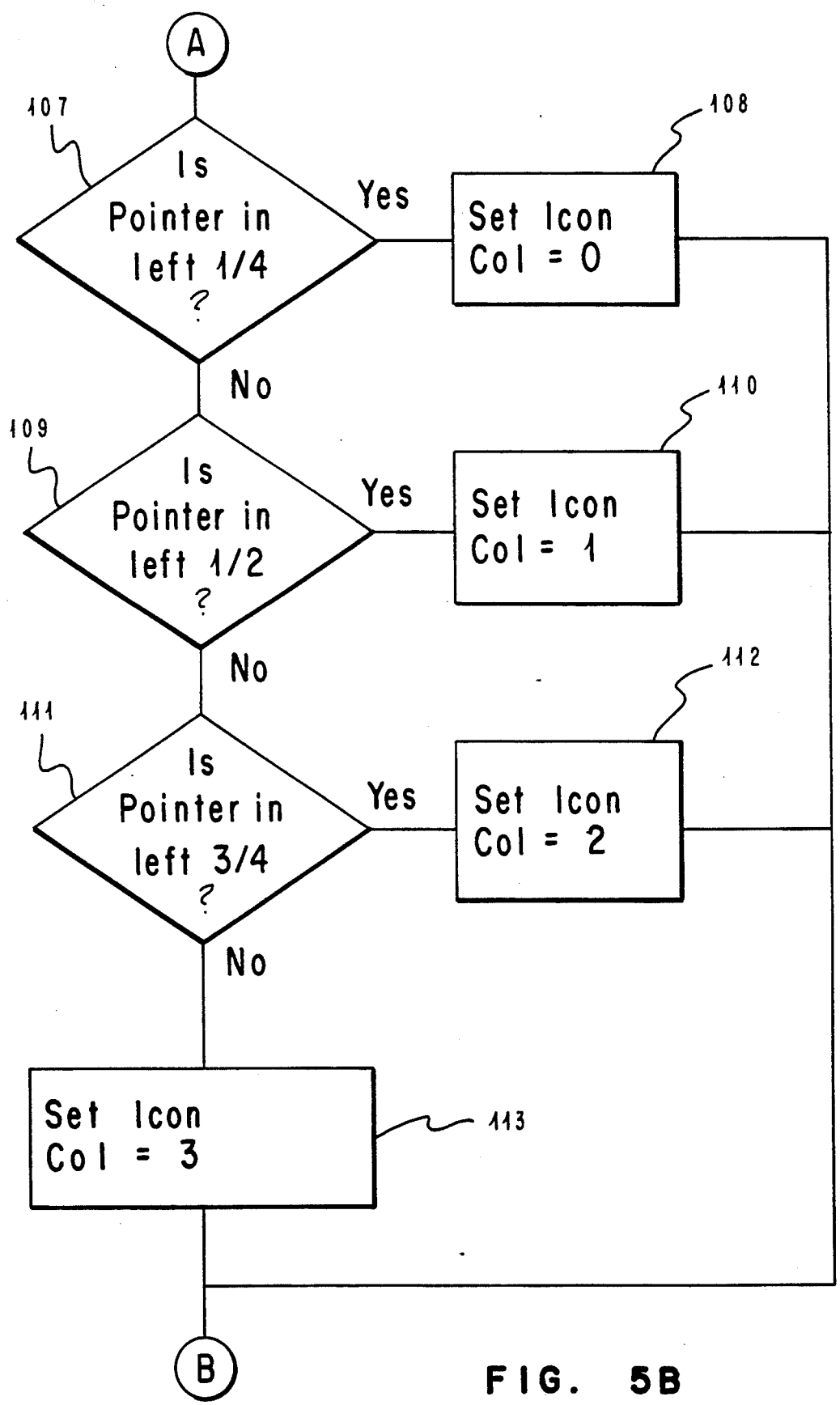
Figure 5C:
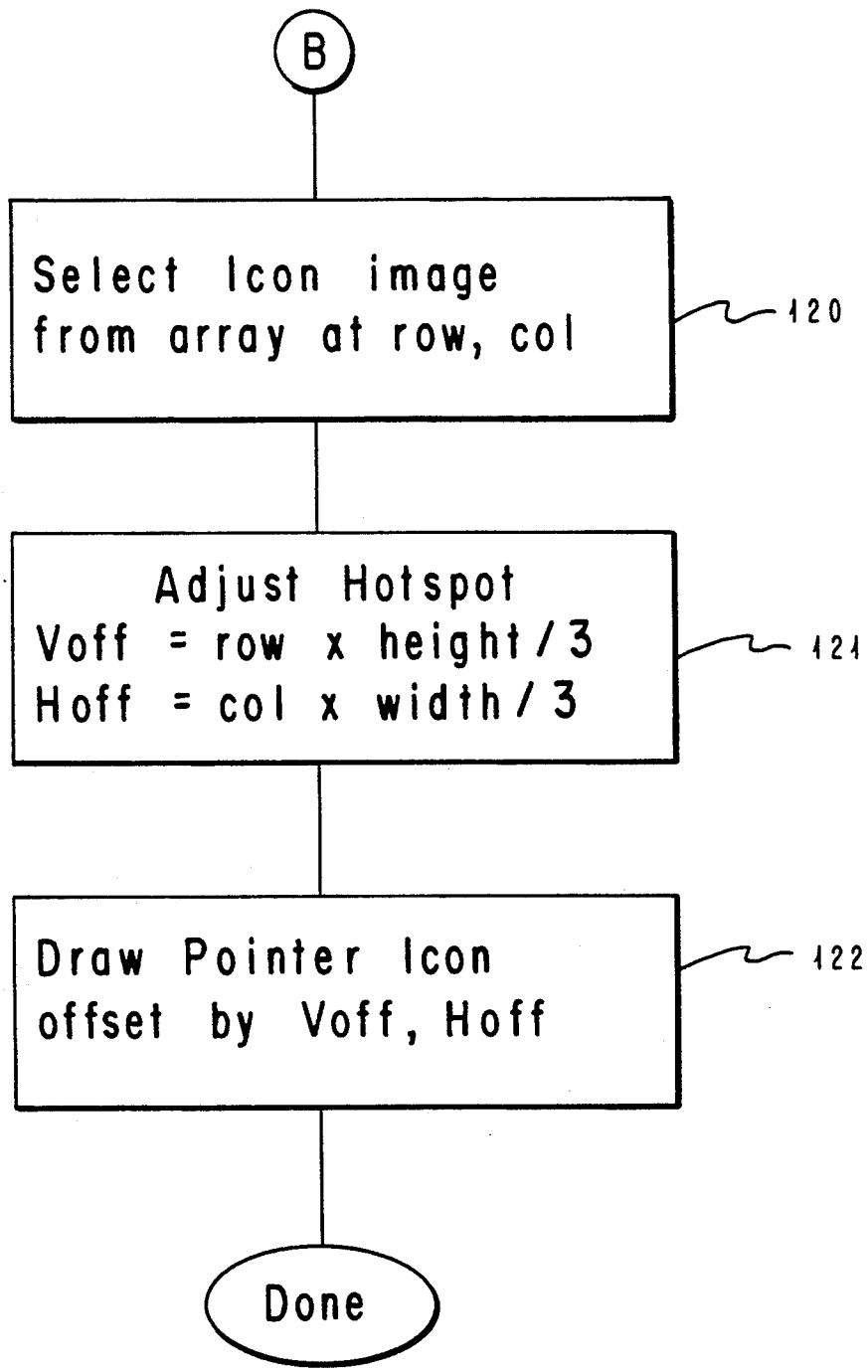

Refer now to the flow chart in FIGS. 5A–5C for a description of the programming utilized to select the appropriate icon pointer in relation to screen position. In FIG. 5A the vertical position of the pointer is determined. At block 100 a test is made to determine if the pointer is in the top one-fourth of the screen. If so, at block 101, the icon to be displayed will come from row zero in the icon image table. If not, at block 102 a test is made to determine if the pointer is in the top half of the screen. If so, at 103 the icon to be displayed is selected from row 1 in the icon image table. If the pointer is not in the top half of the screen, at block 104 a test is made to determine if the pointer is in the top three-fourths of the screen. If so, at 105 the icon will be selected from row 2 of the icon image table. If the pointer is not in the top three-fourths of the screen, the icon to be displayed will come from row 3 of the icon image table as noted in block 106.

The operation then proceeds to FIG. 5B for a determination of the horizontal position of the icon pointer and corresponding selection of the column in the icon image table from which the icon to be displayed will be selected. At block 107 a test is made to determine if the pointer is in the left one-fourth of the display area. If so, at block 108 the icon to be displayed is selected from column 0 of the icon image table. If not, at block 109 a test is made to determine if the icon is presently positioned in the left half of the display area. If so, at block 110, the icon will be selected from column 1 in the icon image table. If not, at block 111 a test is made to determine if the icon is to point to a position in the left three-fourths of the display area. If so, at block 112 the icon to be displayed is selected from column 2 of the icon image table. If not, the icon must point to a position in the right one-fourth of the display area and, in this case, at block 113 the icon is selected from column 3 of the icon image table. By this point in the process, the icon to be displayed is known because its row position in the icon image table was selected by the process of FIG. 5A and the column position of the icon image table was selected by the process of FIG. 5B.

Figure 6:
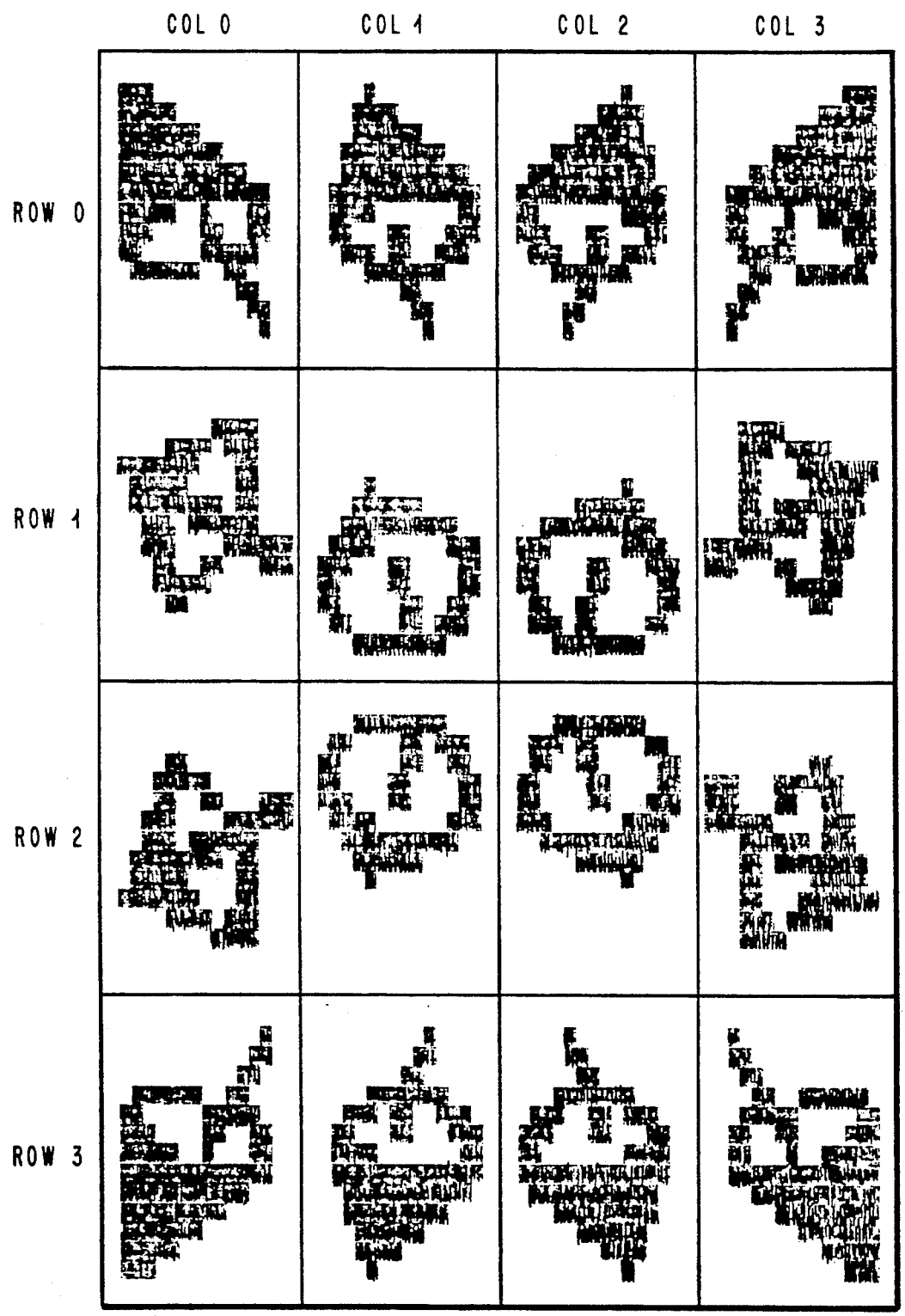
FIG. 6 is a graphical depiction of a collection of icon images which are used in implementing this invention.

The remaining operation is shown in FIG. 5C where, at block 120, the icon image from the row and column of the icon image table determined by the processes of FIGS. 5A and 5B is addressed. At block 121 an offset from the upper left corner position of the icon image is calculated to assist in a logical positioning of the icon image on the screen of the display device. All icon images, other than the one for the upper left corner of the screen are constructed such that their "points" are offset from the upper left corner of the icon image. This effect will be clearly noted by reference to FIG. 6. Thus, for example, when the Row 0, Col. 3 icon image is to be displayed it is necessary to displace it to the left on the display screen by an amount equal to the width of the icon image box. Similarly, when the Row 3, Col. 0 icon image is to be displayed it is necessary to displace it upwardly on the display screen by an amount equal to the height of the icon image box. For the other icon image positions the displacements are less than the width or height of the icon image box. The equation for determining this offset is given in block 121 of FIG. 5. With this calculation it is assumed that the positive directions of screen positioning are to the right and down. After this offset has been calculated, at block 122 the icon image selected at block 120 is communicated to the display device for presentation on the screen thereof.

Those skilled in the art will understand that while the invention has been described above with reference to the display screen's being divided into a grid of 16 areas, additional resolution can be provided by dividing the screen into a larger number of areas and defining more icon images in the icon image table. Further, with display systems in which the capability is provided to download fonts to the display adapter, the icon images may be downloaded as characters to the display adapter and a corresponding character table, rather than as bit mapped images.

Two sets of icon images may be constructed and utilized alternately. One of the sets of icon images may be the video complement of the other set and the image to be displayed in a particular circumstance can depend on whether or not there is other material on the display screen at the icon position. With all points addressable displays it is advantageous to superimpose the icon image over the subject matter pointed to when this subject matter is in the center portion of the display screen.

The following BASIC program is a working embodiment of the invention as described above. It is operable with the IBM DOS CASICA.COM program on IBM personal computers. It is assumed that one of the mouse systems compatible with these computers is installed and that the mouse program conforms to the Microsoft Mouse Driver Standard.

```
1000 '
1010 ' Verify that mouse driver is running
1020 '
1030 DEF SEG = 0
1040 MSEG = 256 * PEEK(51*4+3)+PEEK(51*4+2)
1050 MOUSE = 256 * PEEK(51*4+1)+PEEK(51*4)+2
1060 IF MSEG=0 AND MOUSE=0 THEN GOTO 1090
1070 DEF SEG = MSEG
1080 IF PEEK(MOUSE-2) < > &HCF THEN GOTO 1130
1090 PRINT "Mouse driver not fount":END
1100 '
1110 ' Mouse driver looks ok if we made it here
1120 '
1130 SCREEN 2
1140 DIM ICON%(16,2,4,4) 'Icon bitmap array
1150 '
1160 ' Background (logical AND) mask 1
1170 ' set all background masks to all 1's
1180 '
1190 FOR X=0 TO 3
1200 FOR Y=0 TO 3
1210 FOR Z=0 TO 15
1220 ICON%(Z,0,Y,X)=&HFFFF
1230 NEXT:NEXT:NEXT
1240 ' Foreground 1
1250 ICON%(0,1,0,0)=&H1000 '       0000000000000000
1260 ICON%(1,1,0,0)=&H7000 '       0111000000000000
1270 ICON%(2,1,0,0)=&H7C00 '       0111110000000000
1280 ICON%(3,1,0,0)=&H7F00 '       0111111100000000
1290 ICON%(4,1,0,0)=&H7FC0 '       0111111111000000
1300 ICON%(5,1,0,0)=&H7FF0 '       0111111111110000
1310 ICON%(6,1,0,0)=&H7FFC '       0111111111111100
1320 ICON%(7,1,0,0)=&H7C8C '       0111110010001100
1330 ICON%(8,1,0,0)=&H70CC '       0111000011001100
1340 ICON%(9,1,0,0)=&H60F8 '       0110000011111000
1350 ICON%(10,1,0,0)=&H7F30 '      0011111100110000
1360 ICON%(11,1,0,0)=&H18 '        0000000000011000
1370 ICON%(12,1,0,0)=&HC '         0000000000001100
1380 ICON%(13,1,0,0)=&H4 '         0000000000000100
1390 ICON%(14,1,0,0)=&H0 '         0000000000000000
1400 ICON%(15,1,0,0)=&H0 '         0000000000000000
1410 ' Foreground 2
1420 ICON%(0,1,1,0)=&H0 '          0000000000000000
1430 ICON%(1,1,1,0)=&H0 '          0000000000000000
1440 ICON%(2,1,1,0)=&H0 '          0000000000000000
1450 ICON%(3,1,1,0)=&H78 '         0000000001111000
1460 ICON%(4,1,1,0)=&H7B8 '        0000011110111000
1470 ICON%(5,1,1,0)=&H7F18 '       0111111100011000
1480 ICON%(6,1,1,0)=&H3E18 '       0011111000011000
1490 ICON%(7,1,1,0)=&H3FD8 '       0011111111011000
1500 ICON%(8,1,1,0)=&H1DF8 '       0001110111111000
1510 ICON%(9,1,1,0)=&H1C3F '       0001110000111111
1520 ICON%(10,1,1,0)=&HCC7 '       0000110011000111
1530 ICON%(11,1,1,0)=&HF80 '       0000111110000000
1540 ICON%(12,1,1,0)=&H600 '       0000011000000000
1550 ICON%(13,1,1,0)=&H0 '         0000000000000000
1560 ICON%(14,1,1,0)=&H0 '         0000000000000000
1570 ICON%(15,1,1,0)=&H0 '         0000000000000000
1580 ' Foreground 3
```

-continued

```
1590  ICON%(0,1,2,0)=&H0 '                    0000000000000000
1600  ICON%(1,1,2,0)=&H0 '                    0000000000000000
1610  ICON%(2,1,2,0)=&H0 '                    0000000000000000
1620  ICON%(3,1,2,0)=&H600 '                  0000011000000000
1630  ICON%(4,1,2,0)=&HF80 '                  0000111110000000
1640  ICON%(5,1,2,0)=&HCC7 '                  0000110011000111
1650  ICON%(6,1,2,0)=&H1C3F '                 0001110000111111
1660  ICON%(7,1,2,0)=&H1DF8 '                 0001110111111000
1670  ICON%(8,1,2,0)=&H3FD8 '                 0011111111011000
1680  ICON%(9,1,2,0)=&H3E18 '                 0011111000011000
1690  ICON%(10,1,2,0)=&H7F18 '                0111111100011000
1700  ICON%(11,1,2,0)=&H7B8 '                 0000011110111000
1710  ICON%(12,1,2,0)=&H78 '                  0000000001111000
1720  ICON%(13,1,2,0)=&H0 '                   0000000000000000
1730  ICON%(14,1,2,0)=&H0 '                   0000000000000000
1740  ICON%(15,1,2,0)=&H0 '                   0000000000000000
1750  ' Foreground 4
1760  ICON%(0,1,3,0)=&H0 '                    0000000000000000
1770  ICON%(1,1,3,0)=&H0 '                    0000000000000000
1780  ICON%(2,1,3,0)=&H4 '                    0000000000000100
1790  ICON%(3,1,3,0)=&HC '                    0000000000001100
1800  ICON%(4,1,3,0)=&H18 '                   0000000000011000
1810  ICON%(5,1,3,0)=&H3F30 '                 0011111100110000
1820  ICON%(6,1,3,0)=&H60F8 '                 0110000011111000
1830  ICON%(7,1,3,0)=&H70CC '                 0111000011001100
1840  ICON%(8,1,3,0)=&H7C8C '                 0111110010001100
1850  ICON%(9,1,3,0)=&H7FFC '                 0111111111111100
1860  ICON%(10,1,3,0)=&H7FF0 '                0111111111110000
1870  ICON%(11,1,3,0)=&H7FC0 '                0111111111000000
1880  ICON%(12,1,3,0)=&H7F00 '                0111111100000000
1890  ICON%(13,1,3,0)=&H7C00 '                0111110000000000
1900  ICON%(14,1,3,0)=&H7000 '                0111000000000000
1910  ICON%(15,1,3,0)=&H0 '                   0000000000000000
1920  ' Foreground 5
1930  ICON%(0,1,0,1)=&H0 '                    0000000000000000
1940  ICON%(1,1,0,1)=&H400 '                  0000010000000000
1950  ICON%(2,1,0,1)=&HF00 '                  0000111100000000
1960  ICON%(3,1,0,1)=&HFC0 '                  0000111111000000
1970  ICON%(4,1,0,1)=&H1FF0 '                 0001111111110000
1980  ICON%(5,1,0,1)=&H1FFC '                 0001111111111100
1990  ICON%(6,1,0,1)=&H3FFE '                 0011111111111110
2000  ICON%(7,1,0,1)=&H3C06 '                 0011110000000110
2010  ICON%(8,1,0,1)=&H318E '                 0011000110001110
2020  ICON%(9,1,0,1)=&H1D9C '                 0001110110011100
2030  ICON%(10,1,0,1)=&H7F0 '                 0000011111110000
2040  ICON%(11,1,0,1)=&HC0 '                  0000000011000000
2050  ICON%(12,1,0,1)=&H60 '                  0000000001100000
2060  ICON%(13,1,0,1)=&H20 '                  0000000000100000
2070  ICON%(14,1,0,1)=&H0 '                   0000000000000000
2080  ICON%(15,1,0,1)=&H0 '                   0000000000000000
2090  ' Foreground 6
2100  ICON%(0,1,1,1)=&H0 '                    0000000000000000
2110  ICON%(1,1,1,1)=&H0 '                    0000000000000000
2120  ICON%(2,1,1,1)=&H0 '                    0000000000000000
2130  ICON%(3,1,1,1)=&H0 '                    0000000000000000
2140  ICON%(4,1,1,1)=&H0 '                    0000000000000000
2150  ICON%(5,1,1,1)=&H0 '                    0000000000000000
2160  ICON%(6,1,1,1)=&H400 '                  0000010000000000
2170  ICON%(7,1,1,1)=&HFC0 '                  0000111111000000
2180  ICON%(8,1,1,1)=&H1FF8 '                 0001111111111000
2190  ICON%(9,1,1,1)=&H3C0E '                 0011110000001110
2200  ICON%(10,1,1,1)=&H7186 '                0111000110000110
2210  ICON%(11,1,1,1)=&H6186 '                0110000110000110
2220  ICON%(12,1,1,1)=&H60CC '                0110000011001100
2230  ICON%(13,1,1,1)=&H30DC '                0011000011011100
2240  ICON%(14,1,1,1)=&HFF0 '                 0000111111110000
2250  ICON%(15,1,1,1)=&H0 '                   0000000000000000
2260  ' Foreground 7
2270  ICON%(0,1,2,1)=&H0 '                    0000000000000000
2280  ICON%(1,1,2,1)=&HFF0 '                  0000111111110000
2290  ICON%(2,1,2,1)=&H30DC '                 0011000011011100
2300  ICON%(3,1,2,1)=&H60CC '                 0110000011001100
2310  ICON%(4,1,2,1)=&H6186 '                 0110000110000110
2320  ICON%(5,1,2,1)=&H7186 '                 0111000110000110
2330  ICON%(6,1,2,1)=&H3C0E '                 0011110000001110
2340  ICON%(7,1,2,1)=&H1FF8 '                 0001111111111000
2350  ICON%(8,1,2,1)=&HFC0 '                  0000111111000000
2360  ICON%(9,1,2,1)=&H400 '                  0000010000000000
2370  ICON%(10,1,2,1)=&H0 '                   0000000000000000
2380  ICON%(11,1,2,1)=&H0 '                   0000000000000000
2390  ICON%(12,1,2,1)=&H0 '                   0000000000000000
2400  ICON%(13,1,2,1)=&H0 '                   0000000000000000
```

-continued

| | | |
|---|---|---|
| 2410 | ICON%(14,1,2,1)=&H0 ' | 0000000000000000 |
| 2420 | ICON%(15,1,2,1)=&H0 ' | 0000000000000000 |
| 2430 | ' Foreground 8 | |
| 2440 | ICON%(0,1,3,1)=&H0 ' | 0000000000000000 |
| 2450 | ICON%(1,1,3,1)=&H0 ' | 0000000000000000 |
| 2460 | ICON%(2,1,3,1)=&H20 ' | 0000000000100000 |
| 2470 | ICON%(3,1,3,1)=&H60 ' | 0000000001100000 |
| 2480 | ICON%(4,1,3,1)=&HC0 ' | 0000000011000000 |
| 2490 | ICON%(5,1,3,1)=&H7F0 ' | 0000011111110000 |
| 2500 | ICON%(6,1,3,1)=&H1D9C ' | 0001110110011100 |
| 2510 | ICON%(7,1,3,1)=&H318E ' | 0011000110001110 |
| 2520 | ICON%(8,1,3,1)=&H3C06 ' | 0011110000000110 |
| 2530 | ICON%(9,1,3,1)=&H3FFE ' | 0011111111111110 |
| 2540 | ICON%(10,1,3,1)=&H1FFC ' | 0001111111111100 |
| 2550 | ICON%(11,1,3,1)=&H1FF0 ' | 0001111111110000 |
| 2560 | ICON%(12,1,3,1)=&HFC0 ' | 0000111111000000 |
| 2570 | ICON%(13,1,3,1)=&HF00 ' | 0000111100000000 |
| 2580 | ICON%(14,1,3,1)=&H400 ' | 0000010000000000 |
| 2590 | ICON%(15,1,3,1)=&H0 ' | 0000000000000000 |
| 2600 | ' Foreground 9 | |
| 2610 | ICON%(0,1,0,2)=&H0 ' | 0000000000000000 |
| 2620 | ICON%(1,1,0,2)=&H20 ' | 0000000000100000 |
| 2630 | ICON%(2,1,0,2)=&HF0 ' | 0000000011110000 |
| 2640 | ICON%(3,1,0,2)=&H3F0 ' | 0000001111110000 |
| 2650 | ICON%(4,1,0,2)=&HFF8 ' | 0000111111111000 |
| 2660 | ICON%(5,1,0,2)=&H3FF8 ' | 0011111111111000 |
| 2670 | ICON%(6,1,0,2)=&H7FFC ' | 0111111111111100 |
| 2680 | ICON%(7,1,0,2)=&H603C ' | 0110000000111100 |
| 2690 | ICON%(8,1,0,2)=&H718C ' | 0111000110001100 |
| 2700 | ICON%(9,1,0,2)=&HC9B8 ' | 0011100110111000 |
| 2710 | ICON%(10,1,0,2)=&HFE0 ' | 0000111111100000 |
| 2720 | ICON%(11,1,0,2)=&H300 ' | 0000001100000000 |
| 2730 | ICON%(12,1,0,2)=&H600 ' | 0000011000000000 |
| 2740 | ICON%(13,1,0,2)=&H400 ' | 0000010000000000 |
| 2750 | ICON%(14,1,0,2)=&H0 ' | 0000000000000000 |
| 2760 | ICON%(15,1,0,2)=&H0 ' | 0000000000000000 |
| 2770 | ' Foreground 10 | |
| 2780 | ICON%(0,1,1,2)=&H0 ' | 0000000000000000 |
| 2790 | ICON%(1,1,1,2)=&H0 ' | 0000000000000000 |
| 2800 | ICON%(2,1,1,2)=&H0 ' | 0000000000000000 |
| 2810 | ICON%(3,1,1,2)=&H0 ' | 0000000000000000 |
| 2820 | ICON%(4,1,1,2)=&H0 ' | 0000000000000000 |
| 2830 | ICON%(5,1,1,2)=&H0 ' | 0000000000000000 |
| 2840 | ICON%(6,1,1,2)=&H20 ' | 0000000000100000 |
| 2850 | ICON%(7,1,1,2)=&H3F0 ' | 0000001111110000 |
| 2860 | ICON%(8,1,1,2)=&H1FF8 ' | 0001111111111000 |
| 2870 | ICON%(9,1,1,2)=&H703C ' | 0111000000111100 |
| 2880 | ICON%(10,1,1,2)=&H618E ' | 0110000110001110 |
| 2890 | ICON%(11,1,1,2)=&H6186 ' | 0110000110000110 |
| 2900 | ICON%(12,1,1,2)=&H3306 ' | 0011001100000110 |
| 2910 | ICON%(13,1,1,2)=&H3B0C ' | 0011101100001100 |
| 2920 | ICON%(14,1,1,2)=&HFF0 ' | 0000111111110000 |
| 2930 | ICON%(15,1,1,2)=&H0 ' | 0000000000000000 |
| 2940 | ' Foreground 11 | |
| 2950 | ICON%(0,1,2,2)=&H0 ' | 0000000000000000 |
| 2960 | ICON%(1,1,2,2)=&HFF0 ' | 0000111111110000 |
| 2970 | ICON%(2,1,2,2)=&H3B0C ' | 0011101100001100 |
| 2980 | ICON%(3,1,2,2)=&H3306 ' | 0011001100000110 |
| 2990 | ICON%(4,1,2,2)=&H6186 ' | 0110000110000110 |
| 3000 | ICON%(5,1,2,2)=&H618E ' | 0110000110001110 |
| 3010 | ICON%(6,1,2,2)=&H703C ' | 0111000000111100 |
| 3020 | ICON%(7,1,2,2)=&H1FF8 ' | 0001111111111000 |
| 3030 | ICON%(8,1,2,2)=&H3F0 ' | 0000001111110000 |
| 3040 | ICON%(9,1,2,2)=&H20 ' | 0000000000100000 |
| 3050 | ICON%(10,1,2,2)=&H0 ' | 0000000000000000 |
| 3060 | ICON%(11,1,2,2)=&H0 ' | 0000000000000000 |
| 3070 | ICON%(12,1,2,2)=&H0 ' | 0000000000000000 |
| 3080 | ICON%(13,1,2,2)=&H0 ' | 0000000000000000 |
| 3090 | ICON%(14,1,2,2)=&H0 ' | 0000000000000000 |
| 3100 | ICON%(15,1,2,2)=&H0 ' | 0000000000000000 |
| 3110 | ' Foreground 12 | |
| 3120 | ICON%(0,1,3,2)=&H0 ' | 0000000000000000 |
| 3130 | ICON%(1,1,3,2)=&H0 ' | 0000000000000000 |
| 3140 | ICON%(2,1,3,2)=&H400 ' | 0000010000000000 |
| 3150 | ICON%(3,1,3,2)=&H600 ' | 0000011000000000 |
| 3160 | ICON%(4,1,3,2)=&H300 ' | 0000001100000000 |
| 3170 | ICON%(5,1,3,2)=&HFE0 ' | 0000111111100000 |
| 3180 | ICON%(6,1,3,2)=&H39B8 ' | 0011100110111000 |
| 3190 | ICON%(7,1,3,2)=&H718C ' | 0111000110001100 |
| 3200 | ICON%(8,1,3,2)=&H603C ' | 0110000000111100 |
| 3210 | ICON%(9,1,3,2)=&H7FFC ' | 0111111111111100 |
| 3220 | ICON%(10,1,3,2)=&H3FF8 ' | 0011111111111000 |

-continued

```
3230  ICON%(11,1,3,2)=&HFF8  '                                    0000111111111000
3240  ICON%(12,1,3,2)=&H3F0  '                                    0000001111110000
3250  ICON%(13,1,3,2)=&HF0   '                                    0000000011110000
3260  ICON%(14,1,3,2)=&H20   '                                    0000000000100000
3270  ICON%(15,1,3,2)=&H0    '                                    0000000000000000
3280  ' Foreground 13
3290  ICON%(0,1,0,3)=&H0     '                                    0000000000000000
3300  ICON%(1,1,0,3)=&HE     '                                    0000000000001110
3310  ICON%(2,1,0,3)=&H3E    '                                    0000000000111110
3320  ICON%(3,1,0,3)=&HFE    '                                    0000000011111110
3330  ICON%(4,1,0,3)=&H3FE   '                                    0000001111111110
3340  ICON%(5,1,0,3)=&HFFE   '                                    0000111111111110
3350  ICON%(6,1,0,3)=&H3FFE  '                                    0011111111111110
3360  ICON%(7,1,0,3)=&H313E  '                                    0011000100111110
3370  ICON%(8,1,0,3)=&H330E  '                                    0011001100001110
3380  ICON%(9,1,0,3)=&H1F06  '                                    0001111100000110
3390  ICON%(10,1,0,3)=&HCFC  '                                    0000110011111100
3400  ICON%(11,1,0,3)=&H1800 '                                    0001100000000000
3410  ICON%(12,1,0,3)=&H3000 '                                    0011000000000000
3420  ICON%(13,1,0,3)=&H2000 '                                    0010000000000000
3430  ICON%(14,1,0,3)=&H0    '                                    0000000000000000
3440  ICON%(15,1,0,3)=&H0    '                                    0000000000000000
3450  ' Foreground 14
3460  ICON%(0,1,1,3)=&H0     '                                    0000000000000000
3470  ICON%(1,1,1,3)=&H0     '                                    0000000000000000
3480  ICON%(2,1,1,3)=&H0     '                                    0000000000000000
3490  ICON%(3,1,1,3)=&H1E00  '                                    0001111000000000
3500  ICON%(4,1,1,3)=&H1DE0  '                                    0001110111100000
3510  ICON%(5,1,1,3)=&H18FE  '                                    0001100011111110
3520  ICON%(6,1,1,3)=&H187C  '                                    0001100001111100
3530  ICON%(7,1,1,3)=&H1BFC  '                                    0001101111111100
3540  ICON%(8,1,1,3)=&H1FB8  '                                    0001111110111000
3550  ICON%(9,1,1,3)=&HFC38  '                                    1111110000111000
3560  ICON%(10,1,1,3)=&HE330 '                                    1110001100110000
3570  ICON%(11,1,1,3)=&H1F0  '                                    0000000111110000
3580  ICON%(12,1,1,3)=&H60   '                                    0000000001100000
3590  ICON%(13,1,1,3)=&H0    '                                    0000000000000000
3600  ICON%(14,1,1,3)=&H0    '                                    0000000000000000
3610  ICON%(15,1,1,3)=&H0    '                                    0000000000000000
3620  ' Foreground 15
3630  ICON%(0,1,2,3)=&H0     '                                    0000000000000000
3640  ICON%(1,1,2,3)=&H0     '                                    0000000000000000
3650  ICON%(2,1,2,3)=&H0     '                                    0000000000000000
3660  ICON%(3,1,2,3)=&H60    '                                    0000000001100000
3670  ICON%(4,1,2,3)=&HE3F0  '                                    1110001111110000
3680  ICON%(5,1,2,3)=&HE330  '                                    1110001100110000
3690  ICON%(6,1,2,3)=&HFC38  '                                    1111110000111000
3700  ICON%(7,1,2,3)=&H1FB8  '                                    0001111110111000
3710  ICON%(8,1,2,3)=&H1BFC  '                                    0001101111111100
3720  ICON%(9,1,2,3)=&H187C  '                                    0001100001111100
3730  ICON%(10,1,2,3 =&H18FE '                                    0001100011111110
3740  ICON%(11,1,2,3)=&H1DE0 '                                    0001110111100000
3750  ICON%(12,1,2,3)=&H1E00 '                                    0001111000000000
3760  ICON%(13,1,2,3)=&H0    '                                    0000000000000000
3770  ICON%(14,1,2,3)=&H0    '                                    0000000000000000
3780  ICON%(15,1,2,3)=&H0    '                                    0000000000000000
3790  ' Foreground 16
3800  ICON%(0,1,3,3)=&H0     '                                    0000000000000000
3810  ICON%(1,1,3,3)=&H0     '                                    0000000000000000
3820  ICON%(2,1,3,3)=&H2000  '                                    0010000000000000
3830  ICON%(3,1,3,3)=&H3000  '                                    0011000000000000
3840  ICON%(4,1,3,3)=&H1800  '                                    0001100000000000
3850  ICON%(5,1,3,3)=&HCFC   '                                    0000110011111100
3860  ICON%(6,1,3,3)=&H1F06  '                                    0001111100000110
3870  ICON%(7,1,3,3)=&H330E  '                                    0011001100001110
3880  ICON%(8,1,3,3)=&H313E  '                                    0011000100111110
3890  ICON%(9,1,3,3)=&H3FFE  '                                    0011111111111110
3900  ICON%(10,1,3,3)=&HFFE  '                                    0000111111111110
3910  ICON%(11,1,3,3)=&H3FE  '                                    0000001111111110
3920  ICON%(12,1,3,3)=&HFE   '                                    0000000011111110
3930  ICON%(13,1,3,3)=&H3E   '                                    0000000000111110
3940  ICON%(14,1,3,3)=&HE    '                                    0000000000001110
3950  ICON%(15,1,3,3)=&H0    '                                    0000000000000000
3960  '
3970  CLS
3980  '
3990  ' Reset mouse driver
4000  '
4010  M1%=0: M2%=0: M3%=0: M4%=0
4020  CALL MOUSE(M1%,M2%,M3%,M4%)
4030  '
4040  ' Call mouse driver to display pointer icon
```

```
4050  '
4060  M1% = 1: CALL MOUSE(M1%,M2%,M3%,M4%)
4070  '
4080  ' Loop until Esc is pressed
4090  '
4100  WHILE INKEY$ <> CHR$(27)
4110  '
4120  ' Call mouse driver to set M3%=Horz (0-639),
         M4%=Vert (0-199)
4130  '
4140  PROWSAVE% = PTRROW%: PCOLSAVE% = PTRCOL%
4150  M1% = 3
4160  CALL MOUSE(M1%,M2%,M3%,M4%)
4170  '
4180  ' Select pointer icon and offsets based on mouse
         position
4190  '
4200  IF M4% < 50 THEN PTRROW%=0: GOTO 4240
4210  IF M4% < 100 THEN PTRROW%=1: GOTO 4240
4220  IF M4% < 150 THEN PTRROW%=2: GOTO 4240
4230  PTRROW%=3
4240  IF M3% < 160 THEN PTRCOL%=0: GOTO 4280
4250  IF M3% < 320 THEN PTRCOL%=1: GOTO 4280
4260  IF M3% < 480 THEN PTRCOL%=2: GOTO 4280
4270  PTRCOL%=3
4280  HOFFSET% = PTRCOL*5: VOFFSET% = PTRROW*5
4290  '
4300  ' If row or col has changed, set new pointer icon
         and offset
4310  '
4320  M1%=9
4330  M2% = HOFFSET%
4340  M3% = VOFFSET%
4350  IF (PTRROW% = PROWSAVE%) AND (PTRCOL% = PCOLSAVE%)
         THEN 4370
4360  CALL MOUSE(M1%,M2%,M3%,ICON%(0,0,PTRROW%,
         PTRCOL%))
4370  '
4380  ' Keep looping if Esc wasn't pressed
4390  '
4400  WEND
4410  '
4420  ' Turn off mouse pointer
4430  '
4440  M1% = 1: CALL MOUSE(M1%,M2%,M3%,M4%)
4450  SCREEN 0
```

In summary, with the present invention a perspective view of a pointer icon is utilized such that toward the middle of the display frame the icon appears to point toward the display surface, rather than toward an edge of the display frame. This creates an illusion that the icon, such as an arrowhead, is reversing its direction smoothly in three dimensional space. Although the display screen is only a two dimensional surface, the multiple icons can readily be configured to be shown in perspective and, therefore, appear to be three dimensional, without the requirement for gray scale or half tone display technology. The invention is readily implemented with conventional monochromatic or color graphics hardware commonly available for personal computers.

While the invention has been shown and described with reference to particular embodiments thereof, it will be understood by those skilled in the art that the foregoing and other changes in form and details may be made therein without departing from the spirit and scope of the invention.

I claim:

1. A system for controlling the display of a plurality of computer system perspective pointer image views comprising:

means for determining a position at which one of said perspective pointer image views is to be displayed on a display screen of said computer system; and means responsive to said means for determining for displaying, on said display screen, perspective pointer image views, including a first perspective pointer image view having an axis of said first perspective pointer image view tilted more toward a perpendicular orientation relative to a surface plane of said screen when said perspective pointer image view is displayed near said center of said screen and a second perspective pointer image view having an axis of said second perspective pointer image view tilted more toward a parallel orientation relative to said surface plane of said screen than said first perspective pointer image view when said second perspective pointer image view is displayed near an edge of said screen;

whereby, said means for displaying perspective pointer image views controls display of perspective pointer image views which appear to be three dimensional and which appear to rotate about an axis which is parallel to said surface plane of said screen as said perspective pointer image views are moved through the center of said screen.

2. The system of claim 1 wherein said means for displaying said perspective pointer image views further comprises:

means for storing by row and column addresses, a plurality of perspective pointer image views;

means connected to address said means for storing for identifying from an intended vertical position on said display screen at which said one of said perspective pointer image views is to be displayed, a first row address associated with said plurality of stored pointer images; and means connected to address said means for storing for identifying form an intended horizontal position on said display screen at which said one of said perspective pointer image views is to be displayed, a first column address associated with said plurality of stored pointer images;

whereby said row address and said column address point to one of said first or second perspective pointer image views to be displayed.

3. The system of claim 1 wherein said means for displaying said perspective pointer image views further comprises:

means for offsetting a particular perspective pointer image view on said screen by a vertical and horizontal displacement according to said position on said screen at which said particular perspective pointer image view is to be displayed.

4. The system of claim 2 wherein said display screen is connected to a bit mapped memory in an all points addressable display controller and said particular perspective pointer image view is directly loaded into said memory.

5. The system of claim 4 wherein said means for displaying said perspective pointer image views further comprises:

means for superimposing a portion of said particular pointer image view over another image on said screen.

6. A method of controlling the display of a pointer on a display screen of a computer system, comprising:

determining a position on said screen at which said pointer is to be displayed;

displaying perspective views of said pointer which appears to be three dimensional and which appears to rotate about an axis which is parallel to a surface plane of said screen as said pointer is moved through the center of said screen, including;

displaying a stored first pointer image having an axis of said pointer image tilted more toward a perpendicular orientation relative to said surface plane of said screen when said pointer image is displayed near said center of said screen and a stored second pointer image having an axis of said pointer image tilted more toward a parallel orientation relative to said surface plane than said first pointer image when said second pointer image is displayed near an edge of said screen.

7. The method of claim 6 wherein said displaying said perspective views of said pointer further comprises:

addressing said stored first pointer image when said pointer is near said center of said screen; and addressing said stored second pointer image when said pointer is near said edge of said screen.

8. The method of claim 7 wherein said displaying said perspective views of said pointer further comprises:

offsetting said pointer image on said screen by a vertical and horizontal displacement according to said position on said screen at which said pointer image is to be displayed.

9. The method of claim 8 further comprising:

superimposing a portion of said pointer image over another image on said screen.

* * * * *

UNITED STATES PATENT AND TRADEMARK OFFICE
CERTIFICATE OF CORRECTION

PATENT NO. : 5,179,656
DATED : Jan. 12, 1993
INVENTOR(S) : Ronald J. Lisle

It is certified that error appears in the above-indentified patent and that said Letters Patent is hereby corrected as shown below:

Col. 4, line 18, delete "two-dimensional" and substitute therefor --two dimensional--;
    line 20, before "employed" insert --pointer technique--.

Col. 17, line 16, delete "1" and substitute therefor --2--.

Signed and Sealed this

Seventeenth Day of October, 1995

Attest:

BRUCE LEHMAN

Attesting Officer    Commissioner of Patents and Trademarks